R. C. ELLIOTT.
LINE MEASURING MECHANISM FOR COMPOSING MACHINES.
APPLICATION FILED JAN. 4, 1910.
1,172,268.
Patented Feb. 22, 1916.
3 SHEETS—SHEET 1.
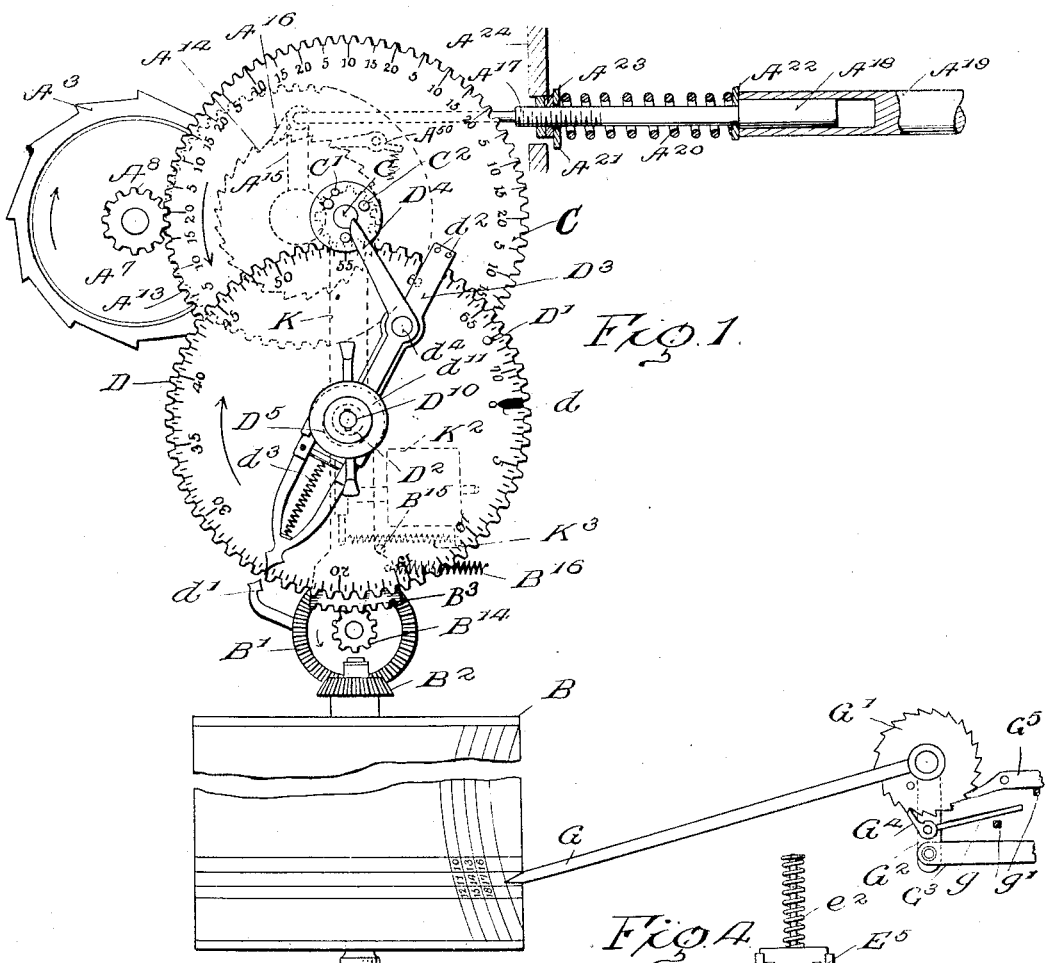
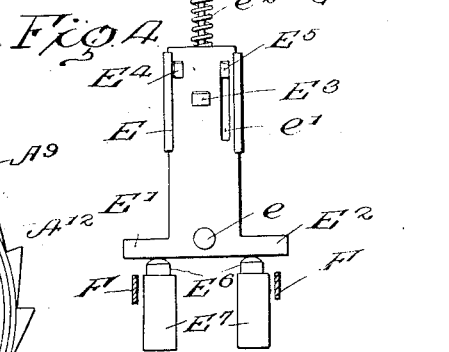
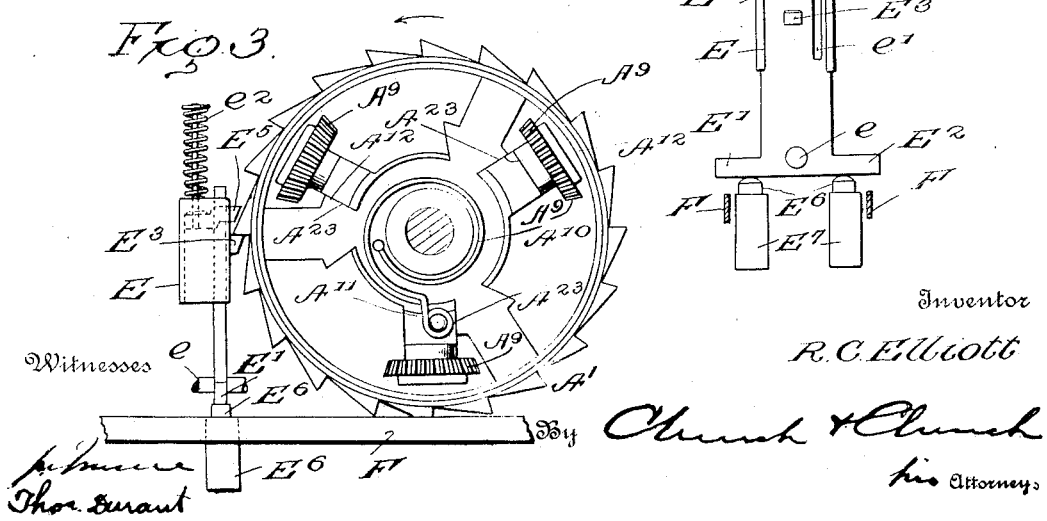
Inventor
R. C. Elliott
By Church & Church
his Attorneys
Witnesses
Thos. Durant

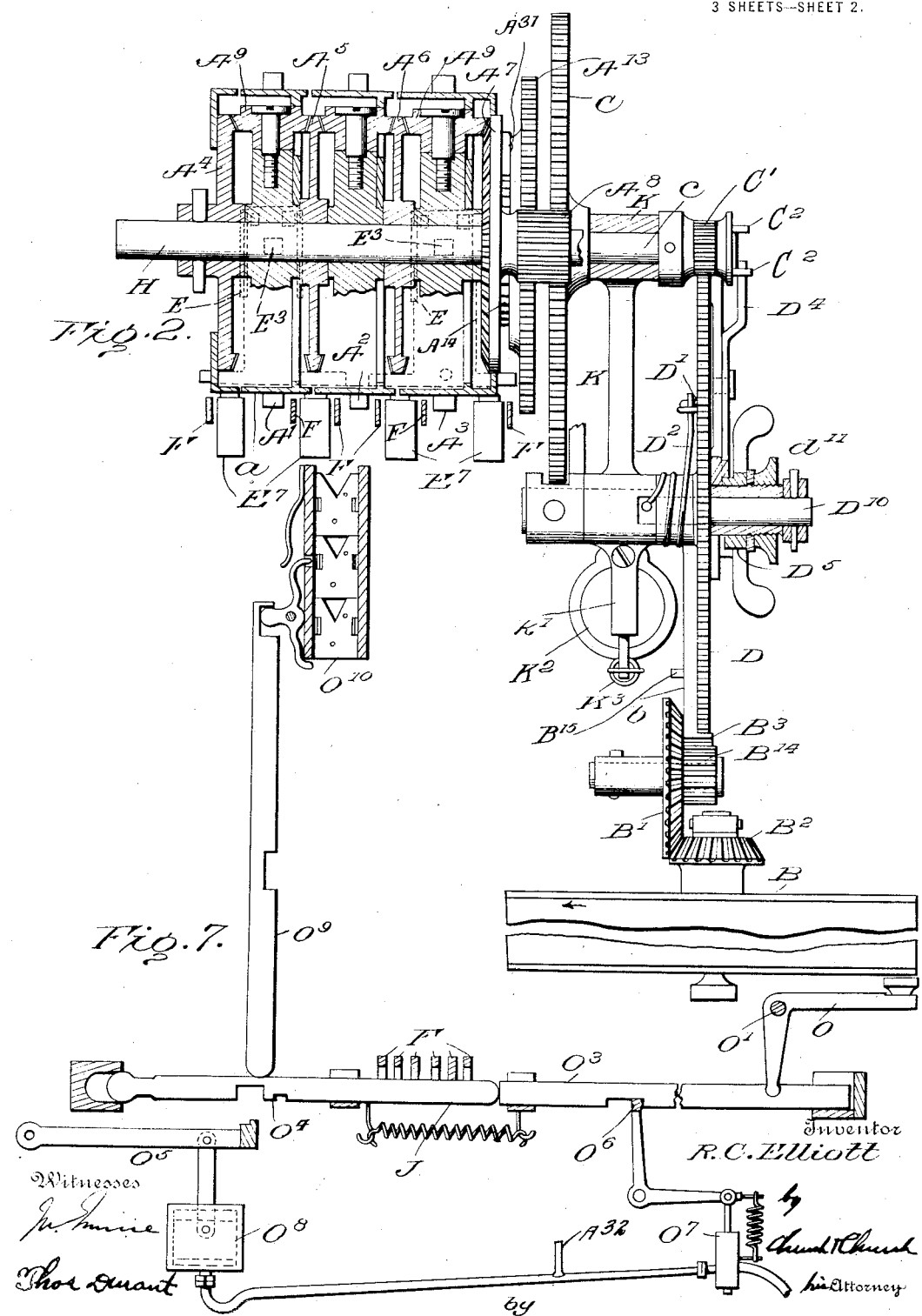

R. C. ELLIOTT.
LINE MEASURING MECHANISM FOR COMPOSING MACHINES.
APPLICATION FILED JAN. 4, 1910.
1,172,268.
Patented Feb. 22, 1916.
3 SHEETS—SHEET 3.
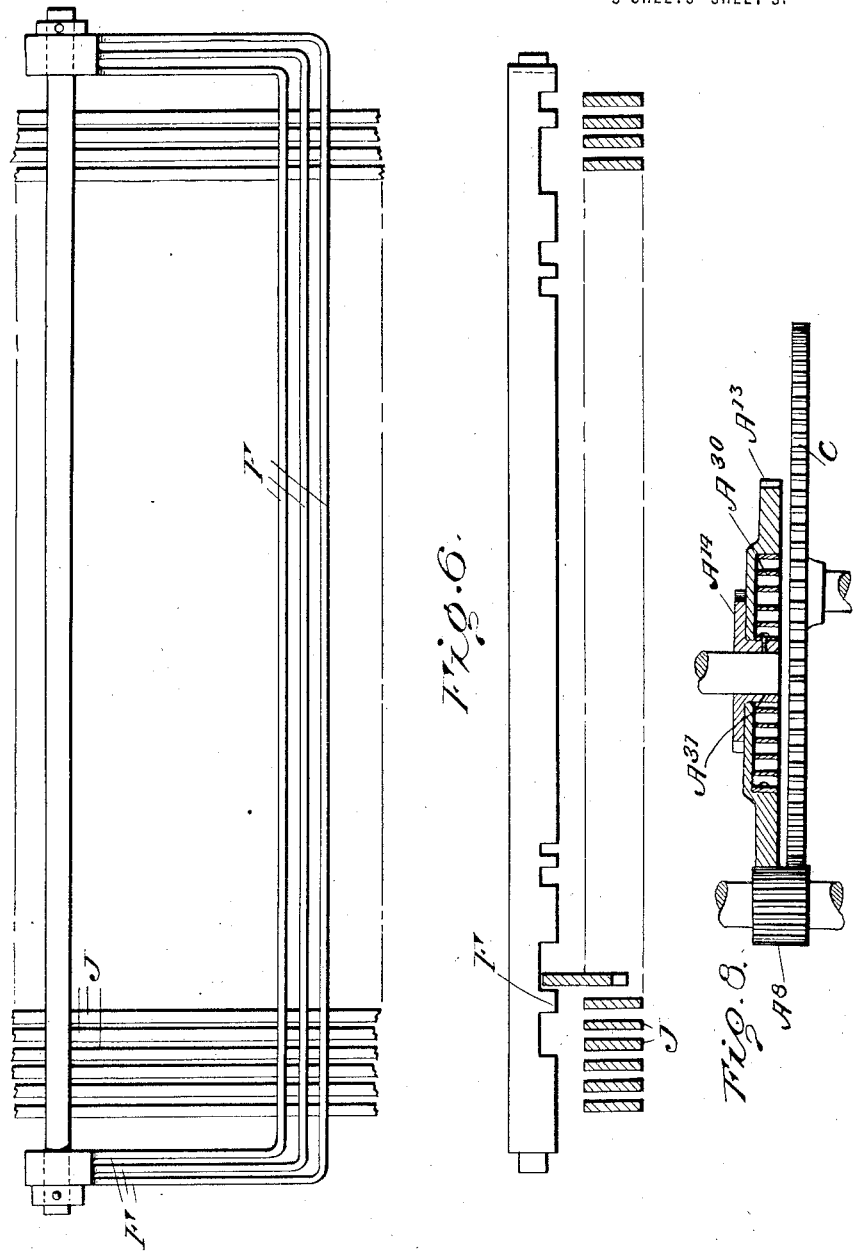
Inventor
R. C. Elliott
Witnesses
Thomas Durant
By Church & Church
his Attorneys

UNITED STATES PATENT OFFICE.

RICHARD CORNELIUS ELLIOTT, OF LONDON, ENGLAND, ASSIGNOR TO LANSTON MONOTYPE MACHINE COMPANY, OF PHILADELPHIA, PENNSYLVANIA, A CORPORATION OF VIRGINIA.

LINE-MEASURING MECHANISM FOR COMPOSING-MACHINES.

1,172,268.     Specification of Letters Patent.     Patented Feb. 22, 1916.

Original application filed September 30, 1908, Serial No. 455,541. Divided and this application filed January 4, 1910. Serial No. 536,315.

*To all whom it may concern:*

Be it known that I, RICHARD CORNELIUS ELLIOTT, a subject of the King of Great Britain, of 18ª Cato road, Clapham, London, in the county of Surrey, England, have invented a certain new and useful Improvement in Line-Measuring Mechanism for Composing Machines; and I do hereby declare the following to be a full, clear, and exact description of the same, reference being had to the accompanying drawings, forming a part of this specification, and to the figures and letters of reference marked thereon.

This invention relates to mechanism for registering total values in comparison with a standard and dividing the ascertained excess or deficiency into a predetermined number of parts, and is specially designed for use in connection with key-controlled type or pattern composing machines for ascertaining the deficiency of the composed matter and the dimensions or fractional increase in the size of the spaces or some of them necessary to fill out or justify each line of composition.

In the more common forms of type casting and composing machines the keys do not act directly upon the type mechanism proper or directly effect the selection or forming of the type; on the contrary they generally operate in connection with a controller or pattern, to record the type signals representing successive lines of matter, the controller subsequently operating in conjunction with the type forming setting or impression mechanism to reproduce the matter thus set up or impressed.

The space accorded each character is, as is well known, of a normal or standard width, set way; but the operator cannot, except by an elaborate and tedious computation, determine beforehand from his "copy" how many "ems" or "units" the matter constituting a line will occupy, nor the amount of line space remaining to be filled out by justification, hence it is usual to supply the composing mechanism with means for measuring the space value of each type and space composed, for instituting a comparison of the total space registered with the measure or line standard, and for indicating the justification fraction for the line, *i. e.*, the quotient of the ascertained line deficiency divided by all or a predetermined number of the spaces contained in the composed line. In type casting machines this justification fraction is distributed throughout the spaces of each line by adjustments affecting certain type only, such as the spaces or quads, so that these will be cast of abnormal width, that is to say, each of a standard or normal width plus the justification fraction. Thus, in the production of types for any given line the space that would otherwise have to be filled out by justification, if types of normal width were used, is absorbed or filled out by the bodies of the widened or abnormal types, resulting in the production of a justified line.

The aforesaid pattern or controller may consist of a strip of paper prepared in a machine wherein, by manipulation of keys, perforations or combinations of perforations are produced representing each character, space, or the like to be cast. The machine of Patent No. 654,115, dated July 17, 1900, to which the present invention is in part applicable, is an example of this type. Or the controller may consist of a series of separate and independent plates or selectors which bear perforations, marks or the like representing individual characters, etc., and which, according to their denomination, are stored in magazines, the delivery and assembly of the selected members being controlled by keys. The machine of Patent No. 897,358, September 1, 1908, is an example of this type and the present invention is also applicable thereto.

In the last named machine the mechanisms for preparing the controller and for casting and setting up the type instead of being contained in separate and independent machines, are combined in a single machine; and there are other known forms of key actuated composing machines and controllers to which the present invention is applicable.

The principal objects of the present invention are to increase the speed and capacity of the registering devices and to these ends the invention consists in the novel construction, combination and arrangement of parts hereinafter fully described and pointed out in the appended claims.

In the accompanying drawings illustrating preferred forms of embodiment of said invention—Figure 1 is a front elevation of the differential and release mechanism and connections forming part of the registering mechanism. Fig. 2 is a transverse vertical section with some parts in elevation of the mechanism of Fig. 1. Fig. 3 is an end view of one section of the differential gear and release devices. Fig. 4 is a front elevation showing one of the multiple escapement devices for controlling the advance of a single differential gear section. Fig. 5 is a plan view and Fig. 6 a sectional elevation of means coupling the keys with the various escapement devices. Fig. 7 is a sectional elevation illustrating the manner of coupling up the registering devices with the keys of a combined composing and casting machine. Fig. 8 is a detail view partly in section showing the motor for the registering devices.

The same letters indicate like parts in the several figures.

The registering mechanism includes among its principal features a plurality of individual registering devices each adapted to register a different value or number of units and so connected through a differential transmission mechanism common to all that any two or more of said registering devices may be simultaneously operated without interference, and the sum of their individual action transmitted to the total register.

In the preferred form of embodiment illustrated the individual registering devices are each represented by a ratchet-toothed wheel or drum $A'$, $A^2$, $A^3$, (three only are shown although any number desired may be employed) and a coöperating detent or escapement E; and the differential transmission mechanism is represented by fixed gear $A^4$, movable gear $A^7$, intermediate double-faced gears $A^5$, $A^6$ and pinions $A^9$, each of the latter connected directly or indirectly with the ratchet-toothed wheels and carried bodily therewith. The ratchet-toothed wheels or drums $A'$, $A^2$ and $A^3$ do not in the embodiment of the invention illustrated bear numbers or numerals, but inasmuch as they correspond in relative location and arrangement to the parts which in many instances of the prior art bear such numbers or numerals, it is thought that they can be best designated herein as registering devices. The teeth of each ratchet wheel $A'$, $A^2$ and $A^3$ differ in pitch from those of their neighbors, the pitch corresponding to different unit-values, so that each wheel will register a predetermined number of units, and alternate ratchet wheels rotate in relatively opposite directions, that is wheels $A'$ and $A^3$ rotate in the same direction and $A^2$ in opposition thereto.

What is herein referred to as a differential transmission mechanism is one whereby the measured motion of any individual registering device supplements that of any other of the associated individual registering devices so that when two or more of said registering devices are simultaneously operated the sum of their individual motions or measures will be transmitted to the final or total registering device or devices. In the preferred form of embodiment of such a mechanism herein illustrated the several ratchet wheels are supported side by side and are free to revolve separately about the fixed shaft H, and each of said wheels carries upon a radially disposed axis or axes one or more (preferably three) pinions $A^9$ lying transverse to and extending on opposite sides of the supporting arms or web. The pinion or pinions $A^9$ pertaining to the ratchet wheel at one end of the series engages gear $A^4$ fixed to shaft H, while the pinion or pinions $A^9$ of the ratchet wheel at the opposite end of the series engages the gear $A^7$, movable on shaft H, while the pinions of adjacent ratchet wheels mesh with double faced gears $A^5$, $A^6$, the two latter turning loosely on shaft H. The arrangement is such that the motion of translation communicated from any one of the ratchet wheels to the pinion or pinions $A^9$ associated therewith will effect a corresponding movement of wheel $A^7$, irrespective of the position of said ratchet wheel in the series. Thus if the ratchet wheel next the loose wheel $A^7$ is advanced, the motion of translation of its pinion $A^9$ will cause the latter to revolve about its axis by virtue of its engagement with the now stationary gear $A^6$, thereby effecting a proportional advance of the gear $A^7$. In like manner if ratchet wheel $A^2$ is advanced its motion of translation in conjunction with its engagement with the now stationary gear $A^5$ will effect a corresponding advance of gear $A^6$, but in a direction opposite the movement of ratchet wheel $A^3$ so that if the latter is at the time stationary, the movement thus communicated to gear $A^6$ will be transmitted through the pinion $A^9$ of the ratchet wheel $A^3$ to gear $A^7$, said pinion $A^9$ being free to turn upon its axis and thereby communicate the motion of gear $A^6$ to gear $A^7$. If two or more of the ratchet wheels are advanced at the same time the sum of the movements of translation of these respective pinions $A^9$ will be transmitted to gear $A^7$. Thus, if the ratchet wheels $A'$ and $A^2$ advance simultaneously and in relatively opposite directions, the motion of translation of the pinion pertaining to ratchet wheel $A'$ will correspondingly advance gear $A^5$ in the same direction with said ratchet wheel, the motion thus given being transmitted through pinion $A^9$ of ratchet wheel $A^2$ to gear $A^6$, and at the same time this motion is augmented or increased by the movement of translation of pinion $A^9$ derived from the motion of its ratchet wheel $A^2$. And if ratchet wheel $A^3$ is also advanced at the same time with ratchet wheels $A'$ $A^2$ the motion of translation communicated to its pinion $A^9$ will correspondingly increase the extent of rotary motion transmitted to gear $A^7$.

The registering mechanism is under the influence of a motor, preferably provided with a spring $A^{30}$, of which latter one end is connected to a wheel $A^{13}$ in gear with pinion $A^8$, and the other to a winding drum $A^{31}$ in the usual manner, said motor tending to rotate the members thereof but actually rotating only such as are released by the respective detents E, as hereinafter explained. There is a tendency, therefore, to run down this spring and means are provided for winding the same up, as required, to maintain the desired degree of tension or pressure. To this end the winding drum to which the spring is attached is provided with a ratchet wheel $A^{14}$, Fig. 1, on whose spindle is mounted an arm $A^{15}$ carrying a pawl $A^{16}$ engaging the teeth of the ratchet wheel, a suitable holding pawl $A^{50}$ being also provided for preventing return motion. Coupled with arm $A^{15}$ is a rod $A^{17}$ carrying a piston $A^{18}$ working in a cylinder $A^{19}$, the latter communicating with the air pressure chamber through the character keys of the keyboard in such manner that each character key when struck will admit air under pressure to cylinder $A^{19}$ with a tendency to force the piston forward and cause pawl $A^{16}$ to advance ratchet wheel $A^{14}$ and wind up the spring. The connection for operating piston $A^{18}$ may be made through a branch $A^{32}$ of the pipe controlled by valve $O^7$ Fig. 7 hereinafter referred to.

To regulate the action of the piston and to retract the latter after pressure in its cylinder is withdrawn, a spring $A^{20}$ is interposed between two collars $A^{22}$, $A^{23}$, loosely fitted to rod $A^{17}$, one of said collars $A^{22}$ engaging a shoulder on the rod and a fixed abutment, such as the end of the cylinder $A^{19}$, and the other $A^{23}$, held to the rod by adjusting nuts, for varying the tension of the spring, and arranged to engage a fixed abutment $A^{24}$.

In order that the total registering or admeasuring devices, may be advanced in accordance with or proportional to the number of units registered, the pitch of the ratchet teeth on each of the wheels $A'$, $A^2$ and $A^3$, are made to correspond to certain units which the various type occupy, or some of these type may be multiples of the unit indicated by the teeth of the ratchet wheels.

Thus in the example shown the teeth of wheel $A'$ are spaced to correspond with a measure of two units, those of wheel $A^2$, three units, and those of wheel $A^3$, five units, and mechanism is provided by which each of these wheels may be moved the distance of one or two teeth at will. Provision is also made whereby any one or two or all the wheels can be advanced separately or simultaneously as required. Thus through the differential gear the cumulative effect of the different registering devices when actuated separately or simultaneously is imparted to the total measuring devices.

The movements of each of the several individual registering devices are determined and controlled, in the present instance, through the medium of an escapement device E in the form of a T-bar furnished with two or more (preferably three) teeth $E^3$, $E^4$, $E^5$, and pivotally supported, as at $e$, opposite its ratchet wheel or drum in position to oscillate transversely of the teeth thereon. The escapements E pertaining to the first and third ratchet wheels $A'$ and $A^3$ are indicated by dotted lines in Fig. 2, while that of the second wheel $A^2$ does not appear in said figure since it is mounted on the opposite side and obscured by the drums. The teeth $E^3$, $E^4$, $E^5$ are spaced in the direction of movement of the escapement device E, to permit successive teeth to be interposed in the plane of movement of the ratchet wheel, and the two outer teeth $E^4$ and $E^5$ are also spaced from the intermediate tooth $E^3$, in the direction of the plane of movement of the ratchet teeth, by an amount somewhat less—preferably one half—the pitch of the teeth on the ratchet wheel with which they are associated.

Teeth $E^3$ and $E^4$ are fixed on the escapement bar, and when the latter is in its intermediate or normal position tooth $E^3$ lies in the plane of movement of the ratchet teeth and through its engagement with one of the latter holds the registering devices stationary against the pressure of the motor tending to advance the same. If, now, the escapement device is moved to the right, Fig. 4, tooth $E^4$ will be interposed in the path of the ratchet teeth simultaneously with the withdrawal of tooth $E^3$, and the registering device will be permitted to advance under the influence of its motor until arrested by the engagement of said tooth $E^4$, and upon the return of the escapement device to normal position tooth $E^3$ will be substituted for tooth $E^4$ and the measured movement of the registering device equal to the pitch of the ratchet teeth will be completed. Thus the movement effected by the successive presentations of these teeth $E^3$, $E^4$, corresponds with the units of the registering device with which they are associated, this unit as before explained being equal to two units of type measure for ratchet wheel $A'$, three units for ratchet wheel $A^2$ and five units for ratchet wheel $A^3$, although, as is obvious, any other proportioning or distribution of units may be employed.

The tooth, $E^5$, unlike $E^3$ and $E^4$, is preferably not fixed or rigid with the escapement bar, but is permitted a limited movement thereon to an extent equal to or approximating the pitch of the ratchet teeth or the interval between successive ratchet teeth, in order to permit a movement of the registering device when said tooth $E^5$ is brought into engagement which is a multiple of the unit represented by tooth $E^4$. To this end said tooth $E^5$ is mounted upon a slide movable in a slot or way $e'$ in the escapement bar and is provided with a retracting spring $e^2$ tending to retain said tooth at one extreme of its movement. It is obvious therefore that when the escapement device is shifted to the left, Fig. 4, and tooth $E^5$ is thereby brought into engagement with the ratchet teeth, the registering devices instead of being arrested after completing a fraction of one unit, as in the case of tooth $E^4$ will be permitted to advance one and a fraction units, so that upon the return of the escapement device to normal position and the reengagement of tooth $E^3$, the registering devices will have completed an advance equal to two units. By so proportioning the teeth of the ratchet wheels, when but three of these are employed, that the unit or pitch of one equals two type units, the second three type units and the third five type units, and controlling the movements of each ratchet wheel through an escapement competent to effect an advance of either one or two units, all the type unit measurements from two to eighteen can be registered.

Each escapement bar is maintained in and returned to normal or intermediate position by spring-actuated pins $E^6$ working in supports $E^7$ and engaging the arms $E'$, $E^2$, on opposite sides of pivot $e$, and beneath each arm $E'$ $E^2$, of each escapement bar is arranged one of a series of bars F, the latter operating to shift the escapement bars to the right or left and cause an advance of the associated registering devices of one or two units.

To adapt the registering mechanism to the machine of Patent No. 654,115, the escapement actuating bars F are disposed above the series of levers J (the punch levers) representing space value and controlled by the keys of the keyboard, so that one of said bars F may serve for all characters of the same type unit value, the bars F being notched or cut away opposite all the levers J save such as represent the same number of type units. In other words, the levers J representing two units will engage only that one of the bars F which controls the two unit escapement, those representing three units will engage only the bar F controlling the three unit escapement, and so on for the bars F controlling respectively the four, five, six and ten unit escapements, while levers J representing other numbers of units will engage the two or more bars F whose values added together equal that of the lever engaged. Thus, for example, the levers J representing nine units might engage bars F representing four and five units, and eighteen units might in like manner be measured by the engagement of the two, six and ten unit bars.

In adapting the improvements to the composing machine of Patent No. 897,358, the selective escapement actuating bars F may also be employed. According to this arrangement the casting of the type is governed by a series of separate controllers or selectors each having perforations controlling valve governing mechanism for bringing into position a corresponding matrix, and a portion of said machine, sufficient to indicate the application of the present improvements thereto, is illustrated in Fig. 7. Each finger key O pivoted at $O'$ engages a longitudinally movable bar $O^3$, the latter in turn engaging a longitudinally and laterally movable bar J to bring its shoulder $O^4$ opposite a reciprocatory driver $O^5$. The bar $O^3$ in moving also engages transverse bar $O^6$, common to all the bars $O^3$, and through a lever connected therewith actuates a valve $O^7$ to admit pressure to a motor $O^8$ the latter connected to driver $O^5$. The driver $O^5$ acting upon the bar J imparts longitudinal motion to the escapement rod $O^9$ that controls the delivery of the selectors $O^{10}$. Owing to inertia and friction the differential transmission gear will tend to lag behind the movement of the keys and levers J and unless means are provided to overcome this the speed at which the key operator can proceed will be reduced. In the embodiment illustrated this objection is overcome by mounting the translating and transmitting pinions $A^9$ of each ratchet wheel upon a frame or support $A^{11}$ independent of the ratchet wheel and rotatable relative thereto on shaft H within predetermined limits, instead of mounting said pinions directly upon the ratchet wheel. Thus each frame $A^{11}$ carrying pinions $A^9$ is provided with a shoulder $A^{12}$, Fig. 3, in position to engage a shoulder $A^{23}$ on the associated ratchet wheel or drum, and a spring $A^{10}$, one end whereof is coupled with frame $A^{11}$ and the other with the ratchet wheel, serves to hold said shoulders $A^{12}$, $A^{23}$, together, and, if separated, applies its pressure in a direction to cause their approach. By this means the differential gear is enabled to overtake the keys and transmit the correct amount of rotary motion to the total registering devices hereinafter described at whatever rate of speed the keyboard operator is working.

It remains to describe the total registering devices, their connection with the individual registers and differential gear, and the automatic control of the mold adjusting devices through said total registering devices. A gear C, hereinafter styled the "units wheel", meshes with pinion $A^8$ of the units registering mechanism and is connected through a pinion C' fast on its shaft $c$ with a second gear D, hereinafter styled the "ems" wheel, the latter turning freely on a stud axle or shaft $D^{10}$. It is desirable that means should be provided whereby units wheel C may be readily disconnected from the registering devices acting upon pinion $A^8$, to permit said units wheel to be returned to an initial or zero position. In the example given, this unclutching or separation is provided for by mounting the shaft $c$ of the units wheel in a frame K pivotally supported upon axle $D^{10}$ so that by the movement of frame K the units wheel can be swung into or out of gear with its driving pinion while retaining its connection with the ems wheel. A spring $K^3$, Fig. 1, engaging an arm $k'$ of frame K, serves for holding the units wheel in engagement with pinion $A^8$, while a motor $K^2$ acting in opposition to said spring provides a convenient means for releasing said units wheel from the driving pinion. The motor $K^2$ shown in the drawings comprises a piston coupled with frame K and working in a cylinder to which air under pressure is admitted as required. Units wheel C is graduated and marked with figures representing type units and in the example given it is marked to represent the units in an "em" as denoted by the "ems" wheel, in other words, the markings on the units wheel are divided into successive series of twenty units each, that being the number of units in an "em", each of said series being divided up in increments of five units, and the latter again subdivided into increments of one unit each. This division and subdivision is convenient in certain classes of work where great accuracy is required for readily and quickly ascertaining the odd number of units occupied in the line. Moreover, the arrangement shown facilitates the reckoning, as the number of "ems" can be read on the ems wheel at the pointer $d'$, and the odd "units" beyond an "em" can be read at the point where the unit wheel passes behind the ems wheel, or at a supplemental pointer properly located. The ems wheel D driven by the units wheel C through a pinion on shaft $c$ is in effect a line scale and is marked on its face or on an attached disk with "em" graduations. Mounted to rotate about an axis coincident with that of the ems wheel D, preferably on a sleeve carried by said wheel, is a pointer $D^3$ registering with the scale on said wheel and adapted to be set by the operator before composition begins, to measure or indicate the length of line, said pointer carrying a stop $D^4$ adapted to engage a stud or pin $C^2$ on the units wheel pinion C'.

In the illustration, Fig. 1, pointer $D^3$ is shown as set for a line of twenty-five "ems" and in starting position with stop $D^4$ engaged with pin $C^2$, and preventing further retrograde motion of the ems wheels so that when set back or returned at the beginning of a line said wheel will be arrested twenty-five units distant from its zero position representing the opposite extremity of the line; in other words, the composition will be completed when the zero mark $d$ is brought into registry with stationary finger $d'$. During composition the ems wheel is rotated in the direction of the arrow, Fig. 1, in opposition to the pressure of a restoring spring $D^2$, one end whereof engages the ems wheel while the opposite end is attached to a fixed support, such as axle $D^{10}$, whereby power is stored for returning the ems and units wheels, at the completion of the line, when frame K is tilted to uncouple the units wheel from its driving pinion $A^8$. The return motion under the influence of spring $D^2$ is arrested at the beginning of the measure indicated on the ems wheel by the engagement of stop $D^4$ with one of the three pins $C^2$. The measure for the line need not be in "ems" or half "ems" as indicated by the divisions on the ems wheels, but may be in units of the "em" the fraction being read upon the units wheel, and for this purpose the line scale indicator $D^3$ and stop $D^4$ are rendered adjustable relatively to the ems wheel. An adjustment for an even number of "ems" is provided for by arranging the arm $D^3$ so that it can move longitudinally on its support on the ems wheel and clamped in position thereon by suitable means, such as the thumb nut $d^{11}$, and providing said arm with one or more (preferably two) teeth $d^2$ in position to interlock with the teeth of the ems wheel. By loosening the nut, arm $D^3$ can be moved radially against the action of a spring $d^3$ to withdraw teeth $d^2$ and permit the arm to be set on any of the graduations of the ems wheel, and when released the spring will carry the pins into engagement with the teeth of the ems wheel and the nut can then be tightened. To provide for a fractional setting of the ems wheel the stop $D^4$ is made in the form of a bell crank lever, pivotally connected at $d^4$ to arm $D^3$, one arm of said lever being furcated and engaging an eccentric $D^5$ surrounding the sleeve of the ems wheel between clamping nut $d^{11}$ and arm $D^3$. Upon releasing and turning the eccentric, stop $D^4$ can be adjusted to arrest the ems wheel one or more units to one side or the other of the "ems" mark indicated by arm D³. The motion of the ems wheel derived from the key controlled registering devices and representing the sum of the type units contained in the line of composition compared with the predetermined line measure, may be transmitted either directly, or, preferably, indirectly to the final registering devices, such as drum B. Thus, in the example illustrated, the ems wheel is furnished with a pin or projection D' in position to engage and move a toothed sector B³ swinging from axle D¹⁰ in rear of wheel D, said sector meshing with pinion B¹⁴ of a transmission gear B⁷. Preferably pin D' is arranged to act as a pick-up for sector B³, to which end its initial or zero position is set at a distance from that of the sector equal to a predetermined number of units or section of the line measure so that the sector and connected parts will not be displaced until the predetermined number of units shall have first been measured and registered. The pin D' and sector B³ constitute a delayed action driving mechanism which causes the drum to rotate only at the terminal of the line, or after composition has proceeded to the beginning of the justification area. During the approach of pin D' the sector is held against a fixed stop B¹⁵ by a retracting spring B¹⁶, Fig. 1, the latter serving to return the sector and connected drum or drums to initial position upon the withdrawal of the pin incident to the resetting of the units and ems wheels at the beginning of each line of composition. Drum B is designed to furnish visual indications of the justifying fractions or keys according to the scheme of Patent No. 654,115.

The visual indicator drum B does not differ essentially from those now in use, it being provided with a precalculated chart and a coöperating pointer G, attached to ratchet wheel G', the latter provided with a holding pawl G⁵, and an actuating pawl G⁴, carried on arm G². The space key is coupled with arm G², as through rod G³, in a manner to cause a unitary advance of the pointer each time a space is registered and means are provided such as pins $g$ to engage and lift pawls G⁴ and G⁵, for returning the pointer to initial position.

The registering mechanism described is also adapted to control automatic justifying mechanism such as that disclosed in application Serial No. 455,541, filed Sept. 30, 1908, (now Patent No. 1,024,503 of April 30, 1912) of which the present application is a division.

Having thus described my invention, what I claim as new and desire to secure by Letters Patent, is:—

1. In a registering mechanism such as described the combination of the following elements, to wit; a plurality of individual registering devices, each arranged to register a plurality of different unit values, a differential transmission mechanism common to said registering devices; and a total register coupled with and controlled by said differential transmission mechanism.

2. In a registering mechanism such as described, the combination of the following elements, to wit; a plurality of individual registering devices each representing a different number of units and a multiple thereof; a differential transmission mechanism common to the several registering devices; and a total registering device coupled with said differential transmission mechanism.

3. In a measuring and registering mechanism for composing machines the combination of the following elements, to wit; a plurality of individual registering devices each including a ratchet and an escapement device equipped to admeasure different degrees of movement, a differential transmission mechanism coupled with and controlled by said registering devices; and key controlled means for actuating the several escapement devices separately and in multiple and to either degree.

4. In a measuring and registering mechanism for composing machines the combination of the following elements, to wit; a plurality of individual registering devices each including a ratchet, and an escapement device, the latter provided with a plurality of admeasuring devices for effecting different degrees of movement of its associated ratchet and movable in different directions to bring said admeasuring means into play; and a differential transmission mechanism controlled by said individual registering devices to effect a degree of motion proportional to that of the individual registering devices when actuated separately or in multiple.

5. In a measuring and registering mechanism for composing machines, the combination of the following elements, to wit; a differential transmission mechanism provided with a plurality of pinions and movable supports therefor; a plurality of individual registers each provided with an escapement and a ratchet; and a yieldable connection between each of said ratchets and the movable support for one of said pinions through which the motion of each individual registering device is transmitted to its pinion and thence to the transmission mechanism.

6. In a measuring and registering mechanism for composing machines, the combination of the following elements, to wit; a differential transmission mechanism provided with a plurality of transmitting pinions and a revoluble support for each of said pinions; a plurality of individual registering devices each including a measuring ratchet wheel and complemental escapement device; and a one way yielding coupling connecting each of said ratchet wheels with the movable support for one of said pinions.

7. In a measuring and registering mechanism for composing machines such as described the combination of the following elements, to wit; a differential transmission mechanism including a plurality of revoluble supports each carrying a pinion; and a plurality of individual registering devices each provided with a ratchet wheel and complemental escapement device, each of said ratchet wheels mounted in juxtaposition to a pinion support and provided with an engaging shoulder therefor and with a spring for advancing the pinion support into contact with said shoulder.

8. In a measuring and registering mechanism for composing machines such as described, the combination of the following elements, to wit; a key controlled registering and indicating mechanism provided with escapement devices and a spring motor, and winding means for said spring motor including ratchet and pawl connections, a motor controlled by the keys and coupled with the driving pawl to advance the latter, and a yielding resistant opposing the advance of the driving pawl motor and operating to retract the driving pawl.

9. In a measuring and registering mechanism for composing machines such as described, the combination with the units and "ems" wheels, of a bearing coupled to rotate with the units wheel and a pointer laterally adjustable upon the "ems" wheel and provided with an arm or projection movable in the path of said bearing.

10. In registering mechanism for composing machines such as described, a total registering mechanism and including, in combination, the following elements, to wit; a units wheel graduated in units of the "ems" and provided with a pinion; a second wheel gearing with said pinion which pinion is equipped with an abutment or pin and graduated in "ems"; a pointer carried by said "ems" wheel and adjustable thereon to the measure; and a stop arm or contact device carried by and adjustable on said pointer and arranged to engage an abutment pin carried by the pinion of the units wheel.

11. In a registering mechanism for composing machines such as described, the combination of the following elements, to wit; a key controlled units measuring device; an index or "ems" wheel coupled with said units measuring device and provided with adjustable means for determining the limit of motion of said index or ems wheel in one direction; an indicator drum; and a delayed action driving mechanism intermediate said "ems" wheel and drum.

12. In a registering mechanism for composing machines such as described, the combination of the following elements, to wit; a graduated index wheel; a fixed pointer; an adjustable pointer pivoted upon the axis of said index wheel and provided with means for retaining it in adjusted position; a stop arm pivotally attached and carried by said adjustable pointer; an arresting member for said stop arm; and means for adjusting said stop arm.

13. In a registering mechanism for composing machines such as described the combination of the following elements, to wit; units registering devices; an index wheel driven from the units registering devices, and graduated in units of the "ems"; a second index wheel gearing with the first named or units wheel and graduated in "ems"; a pointer adjustably secured to the "ems" wheel and carrying an adjustable stop and an arresting member for said stop coupled with and moving in unison with the units wheel.

14. In a measuring and registering mechanism for composing machines, the combination of the following elements, to wit; a plurality of individual registers each provided with means whereby it may be advanced intermittently, a differential transmission mechanism intermediate the registers and embodying pinions, supports on which the pinions are mounted yieldably connected with the registers, and gear wheels in mesh with the pinions of adjacent registers.

15. In a registering mechanism such as described, the combination of the following elements, to wit: a plurality of individual registering devices arranged to register successively increasing values or numbers of units, and each arranged to register one or a plurality of the values or numbers of units registered by it at one operation; a differential transmission mechanism common to said registering devices, and a total register coupled with and controlled by said differential transmission mechanism.

RICHARD CORNELIUS ELLIOTT.

Witnesses:
T. L. RAND,
H. D. JAMESON.